United States Patent
Janssen et al.

(10) Patent No.: US 6,690,432 B2
(45) Date of Patent: Feb. 10, 2004

(54) ALIGNMENT OF THE OPTICAL AND THE ELECTRICAL SCAN IN A SCROLLING COLOR PROJECTOR

(75) Inventors: Peter J. M. Janssen, Scarborough, NY (US); Jeffrey A. Shimizu, Cortlandt Manor, NY (US); John E. Dean, Stormville, NY (US); Douglas A. Stanton, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 439 days.

(21) Appl. No.: 09/833,895

(22) Filed: Apr. 12, 2001

(65) Prior Publication Data

US 2002/0149748 A1 Oct. 17, 2002

(51) Int. Cl.$^7$ .................................................. H04N 9/31
(52) U.S. Cl. ...................... 348/744; 348/760; 348/761; 348/196; 353/28; 353/30; 353/29
(58) Field of Search ................................ 348/744, 750, 348/756, 757, 759, 760, 761, 766, 778, 779, 780, 781, 786, 790, 791, 792, 202, 196, 551, 806, 745; 358/505, 511, 515, 408; 359/443, 448, 449; 353/30, 31, 33, 34, 29, 37, 28, 48–50, 59, 81, 82, 84; 349/5, 7, 57; H04N 9/31

(56) References Cited

U.S. PATENT DOCUMENTS

| | | | | |
|---|---|---|---|---|
| 5,398,082 A | * | 3/1995 | Henderson et al. | 348/781 |
| 5,404,175 A | * | 4/1995 | Nagae et al. | 348/744 |
| 5,416,514 A | * | 5/1995 | Janssen et al. | 348/196 |
| 5,428,408 A | * | 6/1995 | Stanton | 348/744 |
| 5,508,738 A | * | 4/1996 | Janssen et al. | 348/196 |
| 5,548,347 A | * | 8/1996 | Melnik et al. | 348/761 |
| 5,815,221 A | * | 9/1998 | Kojima et al. | 348/750 |
| 6,020,940 A | * | 2/2000 | Ishikawa et al. | 353/49 |
| 6,219,110 B1 | * | 4/2001 | Ishikawa et al. | 348/759 |
| 6,252,636 B1 | * | 6/2001 | Bartlett | 348/760 |
| 6,406,148 B1 | * | 6/2002 | Marshall et al. | 353/31 |
| 6,497,485 B1 | * | 12/2002 | Itoh | 353/31 |

FOREIGN PATENT DOCUMENTS

EP              749201       * 12/1996

* cited by examiner

Primary Examiner—Sherrie Hsia

(57) ABSTRACT

A prism is mounted onto a motor without regard to its rotation angle relative to the motor index. Its position is electronically set later after construction of the optical path. A motor controller is used to control the rotation of the prism. This motor controller keeps the prism spinning at a constant velocity and positions the prism phase (rotation angle versus time). A variable offset is used to position the absolute prism rotation as a function of time. The phase may be advanced or delayed by an operator during set up. Each prism has its own phase. The phase of each prism in the system is set so that the illumination pattern correctly matches the video addressing of the panel. This is a one time set up during construction. The correct positions are set, and stored in non-volatile memory for life.

10 Claims, 1 Drawing Sheet

ALIGNMENT OF THE OPTICAL AND THE ELECTRICAL SCAN IN A SCROLLING COLOR PROJECTOR

FIELD OF THE INVENTION

The present invention relates to a scrolling color projector, and more specifically to the alignment of the optical and the electrical scan in a scrolling color projector.

BACKGROUND OF THE INVENTION

A scrolling color projector produces full color images from a single light modulator by illuminating a liquid crystal panel with multiple stripes of colored light (red, green, blue) that continuously scroll, from top to bottom, over the liquid crystal panel. In order to scroll the multiple stripes of colored light over the liquid crystal panel, the strolling color projector includes a scanner for each color of light to be scrolled over the liquid crystal panel. Each scanner includes a prism connected to the shaft of a motor. The motor controls rotation of the prism. Also attached to the motor is a precision optical encoder which provides information regarding the position of the motor shaft, and correspondingly the rotation of the prism and the scan of each stripe of colored light on the panel.

The precision optical encoder provides information for control of the motor and correspondingly for control of the prism. The phase and rotation of the prism are important because each stripe of colored light must be projected and scrolled on the liquid crystal panel at specific times in relation to video information (electrical scan) that is also provided to the liquid crystal panel. That is, the red, green and blue stripes of light must be present on a line of the display concurrent with the presentation of the corresponding video information. The optical encoder serves to synchronize the phase of rotation of the prism (the scan of the color stripes) with the presentation of the video information. As a result, each stripe of light, as it is being scrolled down the liquid crystal panel, appears on a particular display line coincident with the corresponding video information (electrical scan) for that color of light. The prior art systems impose strict geometrical tolerances on parts during manufacture and assembly to assist in ensuring that the scan of the colored light is synchronous with the video signal (electrical scan). This includes a very accurate mounting of the prism on the motor shaft relative to a reference position of the motor.

A drawback to the prior art systems is that the precision optical encoder is very costly. Typically the optical encoder costs more than the entire scanner, i.e., more than the cost of the prism and the motor together. In addition, the imposition of strict geometrical tolerances on parts during manufacture and assembly adds to the cost of the system. It would therefore be beneficial to provide alignment of the optical and the electrical scan in a scrolling color projector without the use of an external precision optical encoder and strict geometrical tolerances on parts.

OBJECTS AND SUMMARY OF THE INVENTION

It is an object of the present invention to provide a method and apparatus for alignment of the optical and the electrical scan in a scrolling color projector which does not use an optical encoder.

It is a further object of the present invention to provide a method and apparatus for alignment of the optical and the electrical scan in a scrolling color projector which is less expensive than prior art optical and electrical alignment systems.

It is still a further object of the present invention to overcome inherent disadvantages of known methods and apparatus for alignment of the optical and the electrical scan in scrolling color projectors.

In accordance with one form of the present invention, a scrolling color projector for displaying an image on a screen includes a light source for generating an input light, a color splitter for at least one of transmitting and reflecting the input light emitted from said light source to split the light into at least first and second colors, at least a first color scanner including a motor and a prism for receiving as an input the first color of the input light. The motor rotating the prism to provide a scan of a first color scanner output signal on a display. The device also includes a motor controller which controls a rotation of the motor of the at least first color scanner. The motor controller accessing a reference phase offset value indicative of a difference in phase between the scan of the first color scanner output signal and an electrical scan of the display. The motor controller being responsive to the reference phase offset value to alter the rotation of the motor such that the scan of the first color output signal is in phase with the electrical scan of the display.

In accordance with another form of the present invention, a method of aligning the optical and electrical scan in a scrolling color projector includes providing a reference phase signal indicative of timing information for presentation of an optical scan and an electrical scan to a light valve, providing an optical scan and an electrical scan on the light valve in accordance with the reference phase signal, determining a difference in phase between the optical scan and the electrical scan on the light valve, storing the difference in phase between the optical scan and the electrical scan, and providing the optical scan to the light valve based on a combination of the difference in phase and the reference phase signal and providing the electrical scan to the light valve based on the reference phase signal.

A preferred form of the method and apparatus for alignment of the optical and the electrical scan in a scrolling color projector as well other embodiments, objects, features and advantages of the present invention will become readily apparent from the following detailed description of illustrative embodiments, which is to be read in connection with the accompanying drawings.

DETAILED DESCRIPTION OF THE PREFERRED EMBODIMENTS

Figure 1:
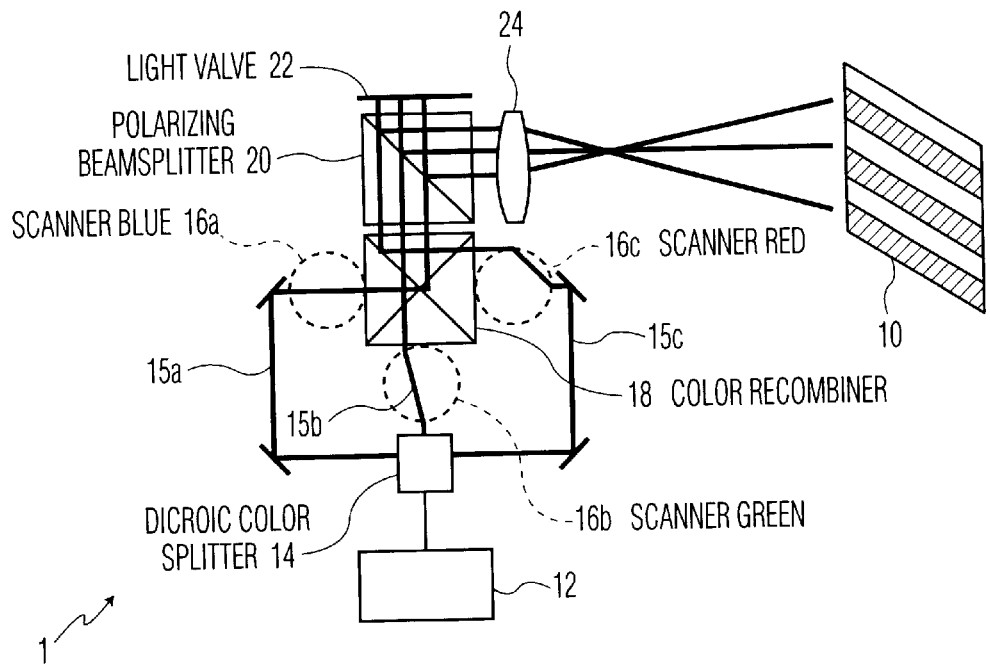
FIG. 1 is a functional block diagram of a scrolling color projector.

Referring now to FIG. 1 of the drawings, a scrolling color projector 1 for displaying an image on a screen 10 is shown. The general concepts regarding a scrolling color projector are discussed in U.S. Pat. No. 5,532,763 to Janssen et al, the entire disclosure of which is incorporated herein by reference. The scrolling color projector includes a light source 12 for generating an input light and a color splitter 14, operatively coupled to the light source, for transmitting and/or reflecting the input light emitted by the light source. The color splitter preferably extracts first, second and third light colors which are traditionally used to generate an image. The three colors correspond to blue, green and red light components which, when combined, form the input light generated by the light source.

Figure 2:
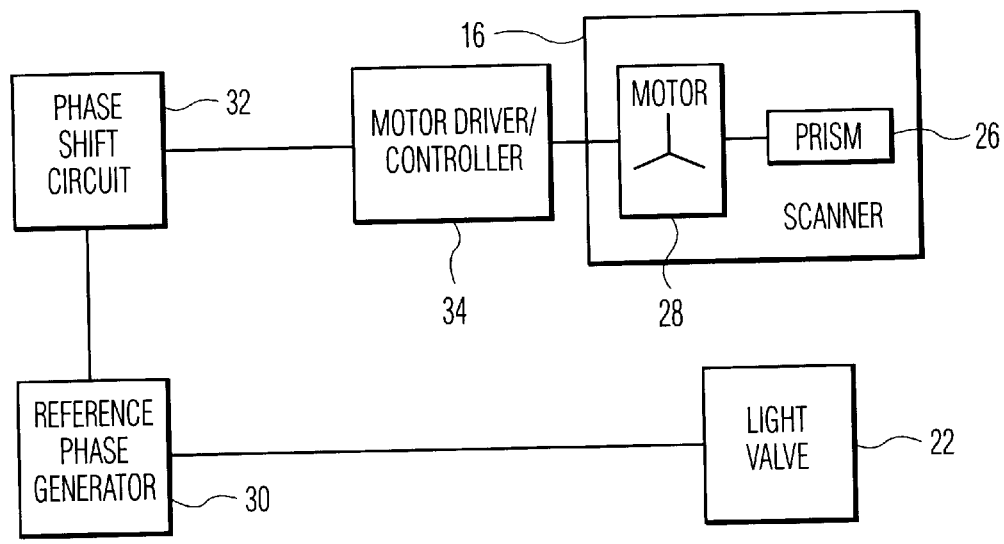
FIG. 2 is a functional block diagram of the apparatus for alignment of the optical and the electrical scan in a scrolling color projector according to the present invention.

The color splitter 14 provides blue, green and red colored light components along separate paths 15a, 15b, 15c. The blue, green and red color light components are provided to respective scanners 16a, 16b, 16c. As known in the art, the scanners 5 include a prism coupled to the shaft of a motor (see FIG. 2). The motor rotates the prism which generates respective stripes of colored light which are provided to a light valve on which an image is to be generated.

The blue, green and red color light components (stripes of colored light) are provided from each respective scanner 16a, 16b, 16c to a color recombiner 18 which recombines the colored light components. The recombined color light components are provided to a polarizing beam splitter 20 which transmits and/or reflects the recombined color light components provided by the color recombiner according to a polarization component of the beam splitter as known in the art. The polarized recombined color light components are then provided to a light valve (liquid crystal panel) 22, as known in the art. The light valve also receives a video signal which is scanned over the light valve and which identifies the portions of the image which are to include each component of light. The light valve also receives a timing signal which provides timing information for presentation of the video signal by the light valve. The light valve modulates each line of the panel in accordance with the video signal and the scan of the polarized recombined color light components. The light valve then provides the result of the video signal and color light components to a projection lens 24 which magnifies the output of the light valve for presentation to the screen 10 for display.

As known in the art, the projection of the blue, green and red stripes of light on the light valve must be synchronized with a video signal which is also provided to the light valve. The presentation of the stripes of colored light is synchronized with the video signal by the timing signal which is not only provided to the light valve, but also to each of the scanners. However, a reference point of the scanner (prism) must be determined to identify the beginning of a light scan on the screen so that when the timing signal indicates that a scan for one color of light should begin, the corresponding prism is oriented at the reference point. As a result, the blue, green and red colored stripes of light can be properly presented on the screen during scanning (scrolling) such that the stripes are concurrently presented on a line of the panel with the corresponding video signal for that respective color of light. In the prior art, this was accomplished by the high precision optical encoder Referring now to FIG. 2, the system for aligning the optical and electrical scan in a scrolling color projector is shown. Each scanner 16 includes a prism 26 operatively coupled to the shaft of a motor 28. In connection with the present invention, the prism may be arbitrarily coupled to the motor shaft such that the orientation of the prism need not correlate to a reference position on the motor. The apparatus includes a reference phase generator 30 coupled to the light valve 22. The reference phase generator generates a reference phase signal (sync signal or timing signal) indicative of timing information for the scanner and the light valve such that the scan of the corresponding stripe of light from the scanner is in phase with the video signal that is also provided to the light valve. The reference phase generator provides the reference phase signal to a phase shift circuit 32 which is interposed between the reference phase generator and a motor controller 34. The phase shift circuit includes a memory (not shown) which stores a phase shift value which is to be added to or subtracted from the reference phase signal provided by the reference phase generator such that the scan of the corresponding stripe of light from the scanner is in phase with the video signal (electrical scan) provided to the light valve.

In the preferred embodiment of the present invention, the phase shift value is determined as follows. Two of the three colored light components are blocked from presentation to the light valve such that only the remaining color of interest is presented to the screen along with the video signal for all three colors of light. The video signals are chosen such that the signal corresponding to the color of interest creates a dark state whereas the two remaining signals provide a bright state.

The operator adjusts the phase of the motor via the motor controller (and accordingly, the phase of the prism and the colored stripe of light) until the brightness of the color of light of interest is minimized (i.e., the signals corresponding with colors other than the colored light of interest are not actuating the colored light of interest). When only the color of interest is dark on the display, this is indicative of the colored stripe of light being in phase with the corresponding video signal. The phase shift (offset) of the reference phase signal which accomplishes the desired result is stored in the memory of the phase shift circuit 32. This process is repeated for each of the colored light components which may have different phase offsets because their scanners include different components. After this initial set-up takes place (i.e., determining the phase shift/offset) the phase shift is combined with the reference phase signal that is provided to the motor controller. As a result, each stripe of colored light is presented to the light valve in phase with a corresponding portion of the video signal to which that stripe of colored light is associated.

The present invention is advantageous because the prism need not be precisely attached to the shaft of the motor, which is extremely difficult and expensive. The prism can be arbitrarily attached to the shaft of the motor. In addition, the system need not include high precision components to ensure alignment of the optical and electrical scan during manufacture. Instead, low precision parts are used and the alignment is performed after the system is assembled so that all tolerances of the parts are taken into account only once after assemblies by the phase shift (offset).

Once the phase offset has been determined for the respective motor and prism, the phase offset need not be changed until one of the system components is replaced.

Having described specific embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the amended claims.

What is claimed:

1. A scrolling color projector for displaying an image on a screen, comprising:
   a light source for generating an input light;
   a color splitter for at least one of transmitting and reflecting the input light emitted from said light source to split the light into at least first and second colors;
   at least a first color scanner including a motor and a prism, the at least first color scanner receiving as an input the first color of the input light, the motor rotating the prism to provide a scan of a first color scanner output signal on a display;

a motor controller which controls a rotation of the motor of the at least first color scanner, the motor controller accessing a reference phase offset value indicative of a difference in phase between the scan of the first color scanner output signal and an electrical scan of the display, the motor controller being responsive to the reference phase offset value to alter the rotation of the motor such that the scan of the first color output signal is in phase with the electrical scan of the display.

2. The scrolling color projector for displaying an image on a screen according to claim 1 further comprising a second color scanner including a motor and a prism, the second color scanner receiving as an input the second color of the input light, the motor rotating the prism of the second color scanner to provide a scan of a second color scanner output signal on the display, wherein the motor controller controls a rotation of the second color scanner, the motor controller accessing a second reference phase offset value indicative of a difference in phase between the scan of the second color scanner output signal and an electrical scan of the display, the motor controller being responsive to the second reference phase offset value to alter the rotation of the second scanner motor such that the scan of the second color output signal is in phase with the electrical scan of the display.

3. The scrolling color projector for displaying an image on a screen according to claim 1 further comprising a third color scanner including a motor and a prism, the third color scanner receiving as an input a third color of the input light, the motor rotating the prism of the third color scanner to provide a scan of a third color scanner output signal on the display, wherein the motor controller controls a rotation of the third color scanner, the motor controller accessing a third reference phase offset value indicative of a difference in phase between the scan of the third color scanner output signal and an electrical scan of the display, the motor controller being responsive to the third reference phase offset value to alter the rotation of the third scanner motor such that the scan of the third color output signal is in phase with the electrical scan of the display.

4. The scrolling color projector for displaying an image according to claim 1 wherein the motor phase offset value is stored in a non-volatile memory which is accessible by the motor controller.

5. The scrolling color projector according to claim 2 wherein the second motor phase offset value is stored in a nonvolatile memory which is accessible by the motor controller.

6. The scrolling color projector according to claim 3 wherein the third motor phase offset value is stored in a nonvolatile memory which is accessible by the motor controller.

7. A method of aligning the optical and electrical scan in a scrolling color projector comprising the steps of:

providing a reference phase signal indicative of timing information for presentation of an optical scan and an electrical scan to a light valve;

providing an optical scan and an electrical scan on the light valve in accordance with the reference phase signal;

determining a difference in phase between the optical scan and the electrical scan on the light valve;

storing the difference in phase between the optical scan and the electrical scan; and providing the optical scan to the light valve based on a combination of the difference in phase and the reference phase signal and providing the electrical scan to the light valve based on the reference phase signal.

8. The method according to claim 7 further comprising the step of storing the difference in phase in a non-volatile memory.

9. The method according to claim 7 wherein the method is performed for each color of light to be scanned.

10. The method according to claim 7 wherein the step of determining a difference in phase comprises the steps of:

providing the electrical scan on the light valve, which includes video information for all colors of light, based on the reference phase signal;

blocking the transmission of all colors of light except for a first color of light;

scanning the first color of light on the light valve based on the reference phase signal; and adjusting the phase of scanning the first color of light on the display until the first color of light is only modulated by the video information pertaining to the first color.

* * * * *